(12) United States Patent
Nakajima (10) Patent No.: US 8,488,468 B2
(45) Date of Patent: Jul. 16, 2013

(54) GROUP CONFERENCE SYSTEM, CONFERENCE SERVER, SESSION SWITCHING CONTROL METHOD AND SESSION SWITCHING CONTROL PROGRAM

(75) Inventor: Kazuaki Nakajima, Tokyo (JP)

(73) Assignee: NEC Corporation, Tokyo (JP)

( * ) Notice: Subject to any disclaimer, the term of this patent is extended or adjusted under 35 U.S.C. 154(b) by 329 days.

(21) Appl. No.: 13/003,476

(22) PCT Filed: Jun. 29, 2009

(86) PCT No.: PCT/JP2009/061842
§ 371 (c)(1),
(2), (4) Date: Mar. 7, 2011

(87) PCT Pub. No.: WO2010/004897
PCT Pub. Date: Jan. 14, 2010

(65) Prior Publication Data
US 2011/0280128 A1    Nov. 17, 2011

(30) Foreign Application Priority Data

Jul. 9, 2008   (JP) ................................ 2008-178979

(51) Int. Cl.
*H04L 12/28* (2006.01)
(52) U.S. Cl.
USPC ........................................................ 370/235
(58) Field of Classification Search
None
See application file for complete search history.

(56) References Cited

U.S. PATENT DOCUMENTS

| | | | |
|---|---|---|---|
| 8,270,586 B2* | 9/2012 | Leung et al. ............. | 379/202.01 |
| 2002/0060989 A1* | 5/2002 | Motobayashi et al. ........ | 370/260 |
| 2006/0153064 A1* | 7/2006 | Caballero-McCann et al. ............................ | 370/216 |
| 2009/0122704 A1* | 5/2009 | DeVal et al. ................... | 370/235 |
| 2011/0267987 A1* | 11/2011 | Asthana et al. ............... | 370/260 |
| 2011/0280128 A1* | 11/2011 | Nakajima ..................... | 370/235 |

FOREIGN PATENT DOCUMENTS

| | | |
|---|---|---|
| JP | 2003-018302 | 1/2003 |
| JP | 2005-100030 | 4/2005 |
| JP | 2007-251419 | 9/2007 |
| JP | 2007243406 | 9/2007 |

OTHER PUBLICATIONS

International Search Report dated Sep. 8, 2009.

\* cited by examiner

*Primary Examiner* — Chirag Shah
*Assistant Examiner* — Amar Persaud
(74) *Attorney, Agent, or Firm* — Scully, Scott, Murphy & Presser PC (57) ABSTRACT

In switching of a conference server in a group conference system, switching of a session of each terminal device is completed smoothly in as a short time period as possible without imposing loads on a call control server. A conference server 121 connected to a call control server 110 which relays a request for call control of a group conference system and a plurality of terminal devices 130, including a session shift control unit 223 which determines an order of a request for call control of each terminal device which request is related to cut-off from a target from which a session is to be shifted and connection to a session shifting destination according to information related to session generation of each terminal device and a conference condition and determines timing of call control based on a load condition of the call control server, and a session shift instructing unit 224 which transmits a request for call control to the call control server according to the determined order and timing.

29 Claims, 8 Drawing Sheets

| TERMINAL | THE NUMBER OF SIMULTANEOUS SESSIONS | CHARGING METHOD | SPEAKER LIST | BASE INFORMATION | CUT-OFF REQUEST | | CONNECTION REQUEST | |
|---|---|---|---|---|---|---|---|---|
| | | | | | SEQUENCE | ORDER | SEQUENCE | ORDER |
| TERMINAL A | 2 | FREE | | X | | | | |
| TERMINAL B | 2 | FREE | | X | | | | |
| TERMINAL C | 2 | CHARGED | | Y | | | | |
| TERMINAL D | 2 | CHARGED | 1 | Y | | | | |
| TERMINAL E | 1 | FREE | 2 | Y | | | | |
| TERMINAL F | 1 | FREE | 3 | X | | | | |
| TERMINAL G | 1 | CHARGED | 4 | X | | | | |
| TERMINAL H | 1 | CHARGED | | X | | | | |

FIG. 6

| TERMINAL | THE NUMBER OF SIMULTANEOUS SESSIONS | CHARGING METHOD | SPEAKER LIST | BASE INFORMATION | CUT-OFF REQUEST | | CONNECTION REQUEST | |
|---|---|---|---|---|---|---|---|---|
| | | | | | SEQUENCE | ORDER | SEQUENCE | ORDER |
| TERMINAL A | 2 | FREE | | X | LAST | | FIRST | |
| TERMINAL B | 2 | FREE | | X | LAST | | FIRST | |
| TERMINAL C | 2 | CHARGED | | Y | IMMEDIATELY AFTER | | FIRST | |
| TERMINAL D | 2 | CHARGED | 1 | Y | IMMEDIATELY AFTER | | FIRST | |
| TERMINAL E | 1 | FREE | 2 | Y | FIRST | | IMMEDIATELY AFTER | |
| TERMINAL F | 1 | FREE | 3 | X | FIRST | | IMMEDIATELY AFTER | |
| TERMINAL G | 1 | CHARGED | 4 | X | FIRST | | IMMEDIATELY AFTER | |
| TERMINAL H | 1 | CHARGED | | X | FIRST | | IMMEDIATELY AFTER | |

FIG. 7

| TERMINAL | THE NUMBER OF SIMULTANEOUS SESSIONS | CHARGING METHOD | SPEAKER LIST | BASE INFORMATION | CUT-OFF REQUEST | | CONNECTION REQUEST | |
|---|---|---|---|---|---|---|---|---|
| | | | | | SEQUENCE | ORDER | SEQUENCE | ORDER |
| TERMINAL A | 2 | FREE | | X | LAST | 9 | FIRST | 5 |
| TERMINAL B | 2 | FREE | | X | LAST | 10 | FIRST | 6 |
| TERMINAL C | 2 | CHARGED | | Y | IMMEDIATELY AFTER | --- | FIRST | --- |
| TERMINAL D | 2 | CHARGED | 1 | Y | IMMEDIATELY AFTER | --- | FIRST | --- |
| TERMINAL E | 1 | FREE | 2 | Y | FIRST | --- | IMMEDIATELY AFTER | --- |
| TERMINAL F | 1 | FREE | 3 | X | FIRST | 1 | IMMEDIATELY AFTER | 2 |
| TERMINAL G | 1 | CHARGED | 4 | X | FIRST | 3 | IMMEDIATELY AFTER | 4 |
| TERMINAL H | 1 | CHARGED | | X | FIRST | 7 | IMMEDIATELY AFTER | 8 |

FIG. 8

| TERMINAL | THE NUMBER OF SIMULTANEOUS SESSIONS | CHARGING METHOD | SPEAKER LIST | BASE INFORMATION | CUT-OFF REQUEST | | CONNECTION REQUEST | |
|---|---|---|---|---|---|---|---|---|
| | | | | | SEQUENCE | ORDER | SEQUENCE | ORDER |
| TERMINAL A | 2 | FREE | | X | LAST | --- | FIRST | --- |
| TERMINAL B | 2 | FREE | | X | LAST | --- | FIRST | --- |
| TERMINAL C | 2 | CHARGED | | Y | IMMEDIATELY AFTER | 4 | FIRST | 3 |
| TERMINAL D | 2 | CHARGED | 1 | Y | IMMEDIATELY AFTER | 6 | FIRST | 5 |
| TERMINAL E | 1 | FREE | 2 | Y | FIRST | 1 | IMMEDIATELY AFTER | 2 |
| TERMINAL F | 1 | FREE | 3 | X | FIRST | --- | IMMEDIATELY AFTER | --- |
| TERMINAL G | 1 | CHARGED | 4 | X | FIRST | --- | IMMEDIATELY AFTER | --- |
| TERMINAL H | 1 | CHARGED | | X | FIRST | --- | IMMEDIATELY AFTER | --- |

FIG. 9

| TERMINAL | THE NUMBER OF SIMULTANEOUS SESSIONS | CHARGING METHOD | SPEAKER LIST | BASE INFORMATION | CUT-OFF REQUEST | | CONNECTION REQUEST | |
|---|---|---|---|---|---|---|---|---|
| | | | | | SEQUENCE | ORDER | SEQUENCE | ORDER |
| TERMINAL A | 2 | FREE | | X | LAST | 15 | FIRST | 9 |
| TERMINAL B | 2 | FREE | | X | LAST | 16 | FIRST | 12 |
| TERMINAL C | 2 | CHARGED | | Y | IMMEDIATELY AFTER | 8 | FIRST | 7 |
| TERMINAL D | 2 | CHARGED | 1 | Y | IMMEDIATELY AFTER | 11 | FIRST | 10 |
| TERMINAL E | 1 | FREE | 2 | Y | FIRST | 3 | IMMEDIATELY AFTER | 4 |
| TERMINAL F | 1 | FREE | 3 | X | FIRST | 1 | IMMEDIATELY AFTER | 2 |
| TERMINAL G | 1 | CHARGED | 4 | X | FIRST | 5 | IMMEDIATELY AFTER | 6 |
| TERMINAL H | 1 | CHARGED | | X | FIRST | 13 | IMMEDIATELY AFTER | 14 |

FIG. 10

| TERMINAL | THE NUMBER OF SIMULTANEOUS SESSIONS | CHARGING METHOD | SPEAKER LIST | BASE INFORMATION | CUT-OFF REQUEST | | CONNECTION REQUEST | |
|---|---|---|---|---|---|---|---|---|
| | | | | | ORDER | TIME | ORDER | TIME |
| TERMINAL A | 2 | FREE | | X | 15 | 3.0 | 9 | 1.8 |
| TERMINAL B | 2 | FREE | | X | 16 | 3.2 | 12 | 2.4 |
| TERMINAL C | 2 | CHARGED | | Y | 8 | 1.6 | 7 | 1.4 |
| TERMINAL D | 2 | CHARGED | 1 | Y | 11 | 2.2 | 10 | 2.0 |
| TERMINAL E | 1 | FREE | 2 | Y | 3 | 0.6 | 4 | 0.8 |
| TERMINAL F | 1 | FREE | 3 | X | 1 | 0.2 | 2 | 0.4 |
| TERMINAL G | 1 | CHARGED | 4 | X | 5 | 1.0 | 6 | 1.2 |
| TERMINAL H | 1 | CHARGED | | X | 13 | 2.6 | 14 | 2.8 |

FIG. 11

GROUP CONFERENCE SYSTEM, CONFERENCE SERVER, SESSION SWITCHING CONTROL METHOD AND SESSION SWITCHING CONTROL PROGRAM

TECHNICAL FIELD

The present invention relates to a group conference system, a conference server, a session switching control method and a session switching control program which, in a group conference system in rich media communication simultaneously using a plurality of communication tools, when a connection destination is switched from a conference server to which each terminal connects to other conference server, enable a session to be shifted to a conference server as a shifting destination without imposing loads on a call control server.

BACKGROUND ART

In IP telephone, for a terminal to switch a connection destination during communication, a third party or the terminal itself asks a call control server to switch a session and the call control server instructs the terminal to switch a session, thereby establishing a session between each terminal and a new connection destination.

In general, a call control server manages numbers of terminals, so that the number of call controls executed at once is limited. Excess of the number of call controls over a threshold value causes congestion to invite a call loss representing a failure in call control. In a large volume of communication, calling is controlled in some cases for preventing a call loss.

As a mechanism which prevents a call loss, disclosed, for example, in Patent Literature 1 (Japanese Patent Laying-Open No. 2007-251419) as related art is a method of preventing generation of a call loss by abandoning a signal related to call control by a congestion control management unit in a call control server. Abandoning a call control signal denotes that call control is regulated at a stage precedent to actual call control, which is a typical method in telephone call control.

Disclosed in Patent Literature 2 (Japanese Patent Laying-Open No. 2007-243406) as related art is a method, for preventing generation of a call loss caused by a large amount of requests for call control issued by a specific terminal, of instructing a gateway device accommodating the specific terminal to abandon a request for call control which is executed by a call control server. This method is also a method of regulating call control at a stage precedent to actual call control.

Patent Literature 1: Japanese Patent Laying-Open No. 2007-251419
Patent Literature 2: Japanese Patent Laying-Open No. 2007-243406

Related art recited in Patent Literature 1 and Patent Literature 2 have a problem that while generation of a call loss itself can be prevented, in a group conference system, session switching of the group conference system fails.

In simultaneous switching of a session in a group conference system which follows switching of a conference server, when call control is regulated during switching, switching of the entire session fails. In other words, when the above-described related art is applied in simultaneous session switching in the group conference system, while generation of a call loss can be prevented, session switching will fail.

Then, when session switching fails, for complementing the switching failure, it is necessary to complete session switching by redialing by an individual terminal.

Thus, since when targeting only on prevention of call loss generation, in simultaneous switching in a group conference system, terminals simultaneously ask for session switching, so that loads will concentrate on a call control server in a short time period to cause a failure of session switching, as well as sharply increasing loads on the call control server due to generation of redialing following a session switching failure.

First problem is that when sessions are simultaneously switched in a group conference system, loads on a call control server are sharply increased to make a call control system unstable as a whole. The reason is that loads on the call control server are sharply increased in a short time period, so that even if a call control request is abandoned for preventing generation of a call loss, further loads caused by redialing will be generated in the call control server and the loads on the call control server will invite control for preventing a further call loss.

OBJECT OF THE INVENTION

The present invention, which is aimed at solving the above-described problems, is to provide a group conference system, a conference server, a session switching control method and a session switching control program which enable, in switching of a conference server in a group conference system, switching of a session of each terminal to be completed as smoothly and in as short time as possible without imposing loads on a call control server.

SUMMARY

According to a first exemplary aspect of the invention, a conference server connected to a call control server which relays a request for call control of a group conference system and a plurality of terminal devices, includes
 a session shift control unit which determines an order of a request for call control of each terminal device which request is related to cut-off from a target from which a session is to be shifted and connection to a session shifting destination according to information related to session generation of each the terminal device and a conference condition and determines timing of call control based on a load condition of the call control server, and
 a session shift instructing unit which transmits a request for call control to the call control server according to the determined order and timing.

According to a second exemplary aspect of the invention, a group conference system including a call control server which relays a request for call control, a plurality of terminal devices and a conference server for controlling session switching of the terminal device, wherein the conference server includes
 a session shift control unit which determines an order of a request for call control of each terminal device which request is related to cut-off from a target from which a session is to be shifted and connection to a session shifting destination according to information related to the session generation of each the terminal device and the conference condition and determines timing of call control based on a load condition of the call control server, and
 a session shift instructing unit which transmits a request for call control to the call control server according to the determined order and timing.

According to a third exemplary aspect of the invention, a session switching control method, wherein a conference server connected to a call control server which relays a request for call control of a group conference system and a plurality of terminal devices executes a session shift control step of determining an order of a request for call control of each terminal device which request is related to cut-off from a target from which a session is to be shifted and connection to a session shifting destination according to information related to session generation of each the terminal device and a conference condition and determining timing of call control based on a load condition of the call control server, and a session shift instructing step of transmitting a request for call control to the call control server according to the determined order and timing.

According to a fourth exemplary aspect of the invention, a session switching control program which causes a computer connected to a call control server that relays a request for call control of a group conference system and a plurality of terminal devices to execute a session shift control processing of determining an order of a request for call control of each terminal device which request is related to cut-off from a target from which a session is to be shifted and connection to a session shifting destination according to information related to session generation of each the terminal device and a conference condition and determining timing of call control based on a load condition of the call control server, and a session shift instructing processing of transmitting a request for call control to the call control server according to the determined order and timing.

First effect of the present invention is enabling switching of a session of each terminal to be completed as smoothly and in as short time as possible without imposing loads on a call control server in switching of a conference server in a group conference system.

EXEMPLARY EMBODIMENT

Structure of Mode of Implementation

Figure 1:
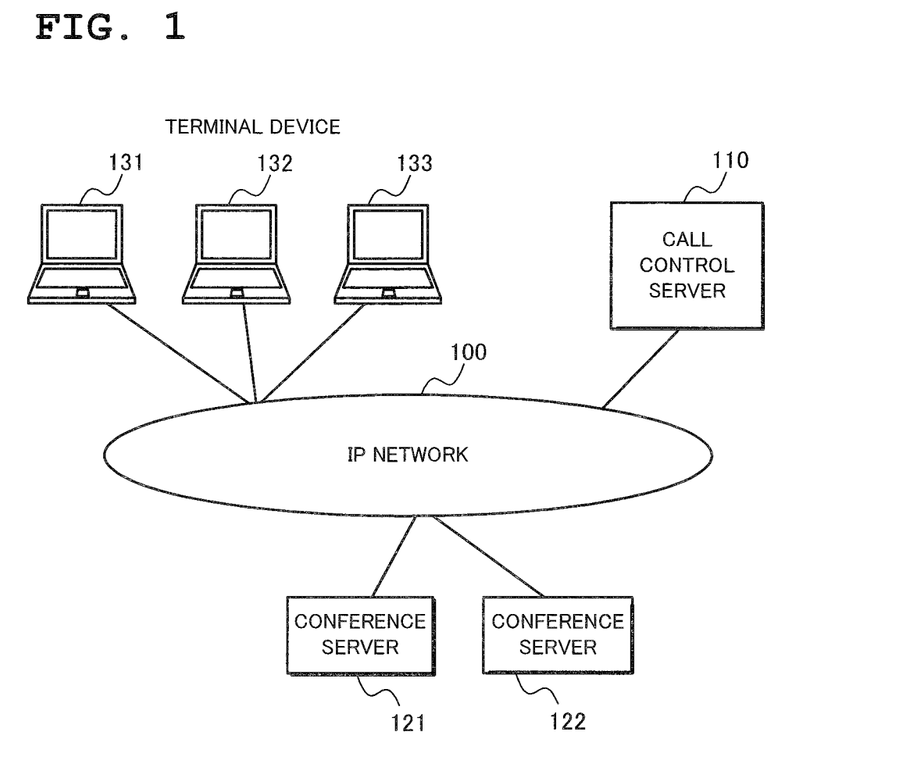
FIG. 1 is a diagram showing an example of a structure of an entire group conference system to which a conference server according to a preferred mode of implementation of the present invention is applied.

Next, a mode of implementation of the present invention will be described in detail with reference to the drawings. FIG. 1 is a diagram showing an example of a structure of an entire group conference system to which a conference server according to a preferred mode of implementation of the present invention is applied.

In FIG. 1, as a device forming a group conference system, connected centered around an IP network 100 are a call control server 110, two conference servers, a conference server 121 and a conference server 122 as a target from which a session is shifted or as a session shifting destination, and a plurality of terminal devices 131, 132 and 133.

The conference servers 121 and 122 are provided as a server device in some cases and when maintenance or the number of accommodated terminals of the conference server draws near to a limit, for shifting a session to a conference server having a large capacity, the technique according to the present invention can be used. There is also a case where some of the same devices as a terminal device have a function of a conference server, and for holding group conference only among the terminal devices, the technique according to the present invention can be used for shifting the function of the conference server to other terminal device when a terminal whose server function is operating stops halfway.

Figure 2:
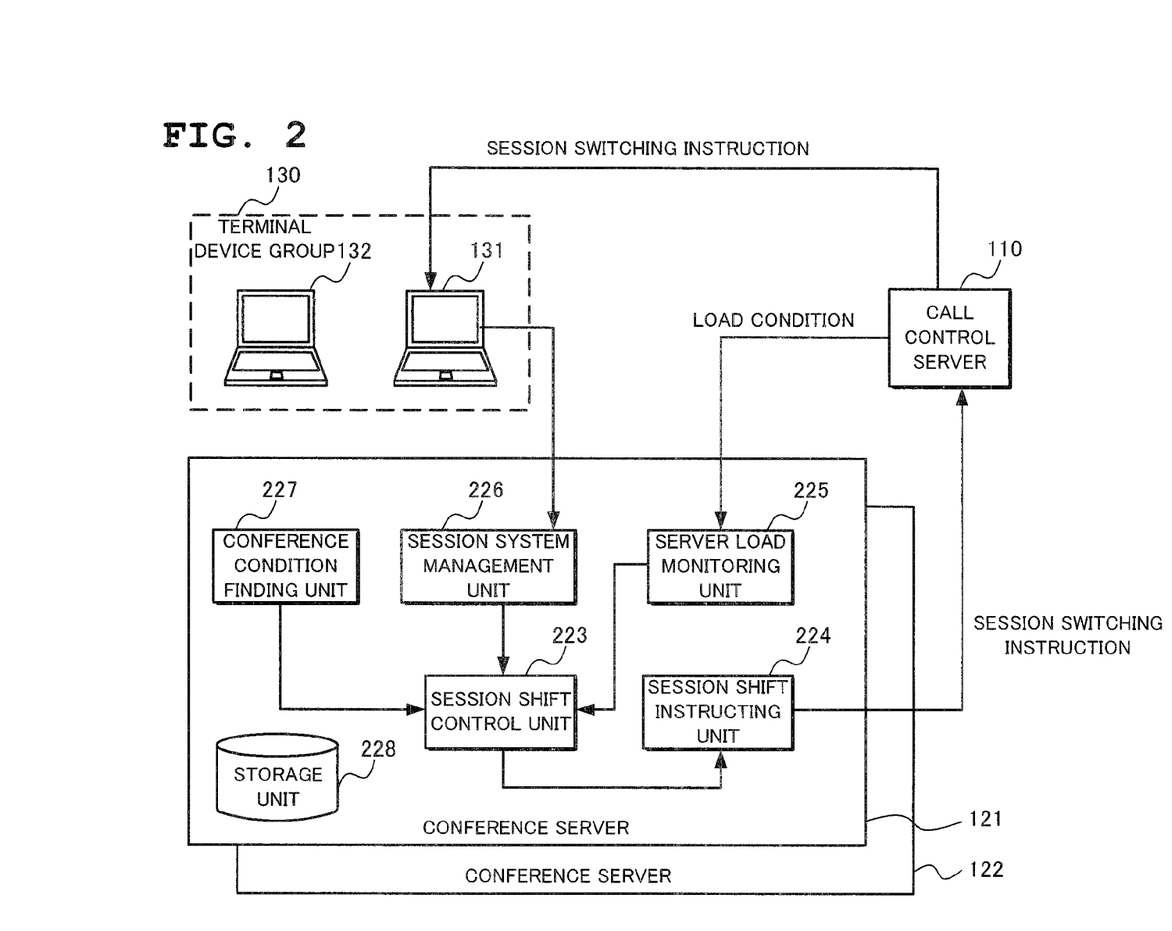
FIG. 2 is a block diagram showing a structure of the conference server according to the present mode of implementation of the present invention.
Figure 3:
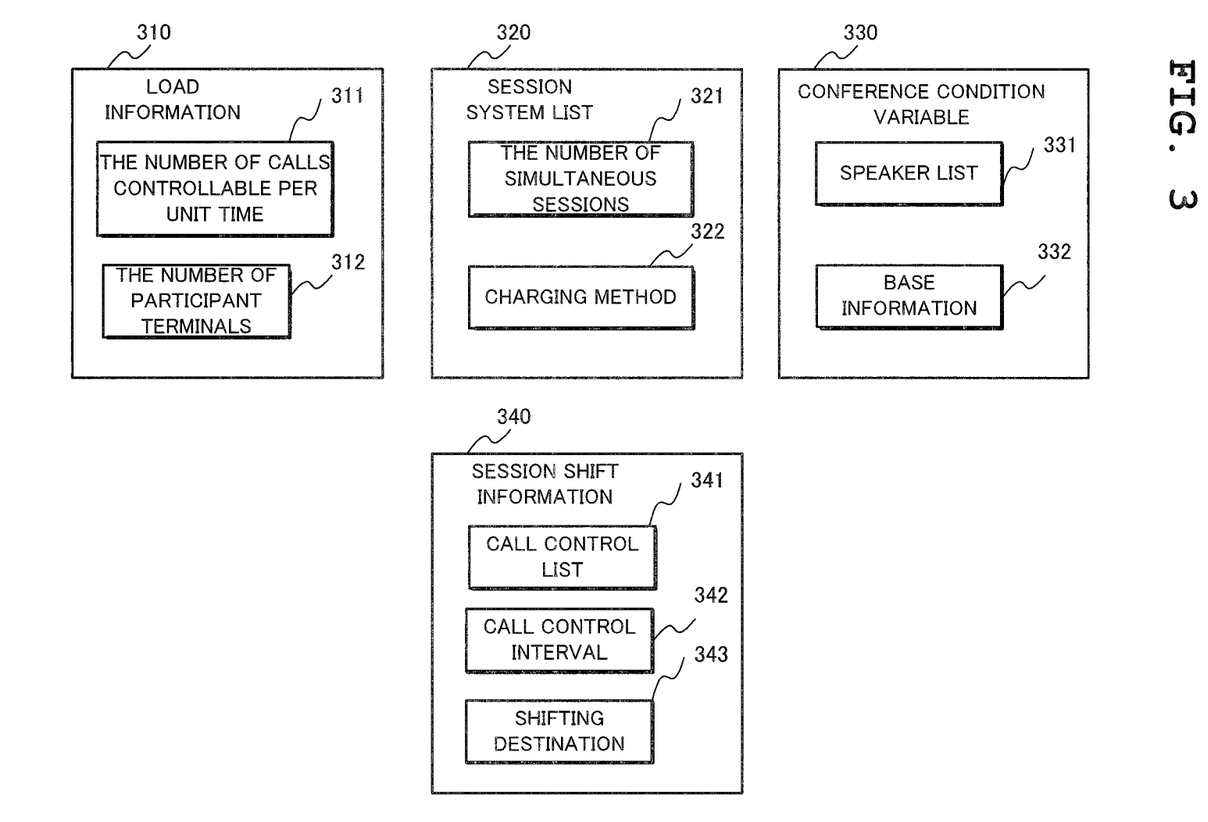
FIG. 3 is a diagram showing a data structure of the conference server according to the present mode of implementation of the present invention.

Next, details of the conference server according to the mode of implementation of the present invention will be described with reference to FIG. 2 and FIG. 3. FIG. 2 is a block diagram showing a structure of the conference servers 121 and 122.

In FIG. 2, the group conference system comprises the call control server 110, the conference server 121 and the conference server 122 and a terminal device group 130 (the terminal devices 131 and 132). Description will be here made assuming that the conference server 121 is a conference server from which a session is to be shifted and the conference server 122 is a conference server as a session shifting destination.

The call control server 110 is connected to the conference server 121 and a plurality of terminal devices such as the terminal device 131 and the terminal device 132 in the terminal device group 130 to communicate information about a request for call control of instructing on session switching. In addition, the call control server 110 is connected to the conference server 121 to transmit a load condition of the call control server 110 to the conference server 121.

As a message of a session switching instruction from the conference server 121, the call control server 110 receives a call control request and transfers the request for call control to each terminal device. Call control request has two kinds, session cut-off and session set-up, and when each terminal device shifts a session, the device cuts off a session with the conference server 121 to newly set up a session with the conference server 122. When the terminal device is allowed to make two or more sessions at the same time, the device is also allowed to cut off the session with the conference server 121 after setting up a session with the conference server 122.

The call control server 110 further transmits a load condition of the call control server 110 to the conference server 121 and transmits the number of call control requests which can be processed by the call control server 110 per unit time to the conference server 121 according to a request from the conference server 121.

As shown in FIG. 2, the conference server 121 comprises a session shift control unit 223, a session shift instructing unit 224, a server load monitoring unit 225, a session system management unit 226, a conference condition finding unit 227 and a storage unit 228 and further includes a communication relaying function and an application function necessary as a server of a conference.

Although the conference server 122 includes the same components as those of the conference server 121, when shifting a session of a group conference system from the conference server 121 to the conference server 122, not the components of the conference server 122 but those of the conference server 121 are used to communicate with the call control server 110 and shift a session of each terminal device to the conference server 122.

The session shift control unit 223 is connected with the session shift instructing unit 224, the server load monitoring unit 225, the session system management unit 226 and the conference condition finding unit 227 to determine an order and timing of session shift of each terminal device.

When instructed to shift a conference server, the session shift control unit 223 first transmits a request for acquiring load information of the call control server 110 to the server load monitoring unit 225 and as a response, receives load information 310 related to the call control server 110 (the number 311 of calls controllable per unit time and the number 312 of participant terminals). Based on the number 311 of calls controllable per unit time which is included in the load information 310, define call control request generation timing.

Next, the session shift control unit 223 receives the number 312 of participant terminals and a session system list 320 from the session system management unit 226. The number 312 of participant terminals represents the number of terminals participating in the group conference system. Held in the session system list 320 is information related to session generation of each terminal device (e.g. contract information of a session of each terminal device) as a list structure. The information related to the session generation includes the number 321 of simultaneous sessions for determining whether the respective terminal devices are allowed to simultaneously generate a plurality of sessions and a charging method 322 indicating whether it is free communication or charged communication.

Based on the number 321 of simultaneous sessions and the charging method 322, determine a switching sequence of a session of each terminal device. The switching sequence includes three patterns, to execute "first", to execute "immediately after" and to execute "last". Handled here as a call control request are two kinds, cut-off and connection. Of the cut-off and the connection, one to be executed first will be defined as "to execute first" and the other to be executed immediately after the first executed request will be defined as "to execute immediately after". Then, call control to be executed in the lump last when a series of call control ends will be defined as "to be executed last".

In a case of a terminal device whose number 321 of simultaneous sessions is "1", determine to first cut off (execute first) a session to the conference server 121 and connect (execute immediately after) to the conference server 122 immediately thereafter irrespective of a charging method.

In a case of a terminal device whose number 321 of simultaneous sessions is "2" or more, determine to first connect to the conference server 122 (execute first) and then cut off a session to the conference server 121.

In a case of a terminal device whose number 321 of simultaneous sessions is "2" or more and whose communication is free, determine a sequence to cut off a session to the conference server 121 last after switching of the sessions of all the terminal devices is sequentially completed. In a case of charged communication, determine to cut off a session to the conference server 121 immediately after when connection to the conference server 122 is completed (execute immediately after).

Smooth shift from the conference server 121 to the conference server 122 without interruption of communication is enabled by thus determined sequence without imposing loads on the call control server 110 in a short time period by generating a session at the same time by terminal devices capable of simultaneously generating a session.

Next, the session shift control unit 223 obtains a conference condition variable 330 from the conference condition finding unit 227 to determine an order of session shift for each terminal device. When not using the conference condition variable 330, determine an order of session shift for each terminal device according to an order of connection made. Stored in the conference condition variable 330 are a speaker list 331 and base information 332.

It is possible to sequentially determine session shift starting with a terminal device having the longest speech time and operation time based on the speaker list 331. This allows, even when shift of a conference server is yet to be completed with respect to all the terminal devices, that is, while a conference server is being shifted, a person who speaks a lot to immediately start speaking by a conference server after the shift.

In addition, the base information 332 can be used and in this case, shift of a session of a terminal device at the same base is controlled to be displaced with each other. Group the terminal devices by each base and based on the speaker list 331, determine an order of shift of the terminal devices in the group. Then, sequentially merge a shift order of a group at each base from the top to determine a session shifting order as a whole.

Session shift information 340 is determined by a series of session shift order determining method to define a call control list 341, a call control interval 342 and a shifting destination 343.

Thereafter, the session shift control unit 223 issues a request for call control to the session shift instructing unit 224 at an interval recited in the call control interval 342 based on the call control list 341. At this time, when a call loss is generated due to a rapid change of a condition of other communication or the like, a notification is made from the session shift instructing unit 224 to increase the value of the call control interval 342, thereby reducing a probability of call loss generation. When the call control request is issued to all the participant terminal devices to result in a success, the processing is completed to end the session shift.

The session shift instructing unit 224 is connected to the call control server 110 and the session shift control unit 223 to make a request for call control to the call control server 110 according to the session shift information 340.

The session shift information 340, which includes the call control list 341 and the call control interval 342, has a command of a call control request and its generation interval determined. According to the information, sequentially transmit a request for call control to the call control server 110.

When the request for call control fails and a call loss is generated, notify the session shift control unit 223 to increase a numerical value of the call control interval by the session shift control unit, thereby again reducing a probability of generation of a call loss.

The server load monitoring unit 225, which is connected to the call control server 110 and the session shift control unit 223, obtains a load of the call control server 110 at the time of session shift to transmit the number 311 of calls controllable per unit time to the session shift control unit 223. According to a request from the session shift control unit 223, inquire of the call control server 110 about loads, so that the call control server 110 returns the current number 312 of calls controllable per unit time. Then, cause the storage device 228 to store the information and return the number 312 of calls controllable per unit time to the session shift control unit 223 having made the request.

The session system management unit 226 obtains session system information of each terminal device from a terminal device participating in the group conference system included in the terminal device group 130 to cause the storage unit 228 to store the information as the session system information 320. The session system information 320, which includes the number 321 of simultaneous sessions for determining whether the respective terminal devices are allowed to simultaneously generate a plurality of sessions and the charging method 322 indicating whether it is free communication or charged communication with respect to each terminal device, is stored in the storage unit 228 as information inherent to the terminal device and transmitted to the session shift control unit 223 according to a request from the session shift control unit 223.

The conference condition finding unit 227 obtains the conference condition variable 330 of each terminal device from the server function or the like of the group conference system provided in the conference server 121 and causes the storage unit 228 to store the variable as the conference condition variable 330. The conference condition variable 330, which includes the speaker list 331 and the base information 332, is transmitted to the session shift control unit 223 according to a request from the session shift control unit 223.

The storage unit 228 stores the load information 310, the session system list 320, the conference condition variable 330 and the session shift information 340 and holds information necessary for determining an order and an interval of session shift.

The terminal device group 130 includes numbers of terminal devices such as the terminal device 131 and the terminal device 132 participating in the group conference system. With the terminal device 131 as a representative for description, the terminal device 131 is connected to the call control server 110 and the conference server 121. Upon reception of a call control request transferred from the call control server 110, switch a connection destination. More specifically, in a case of call control for cut-off, cut off connection with the conference server 121 as of before shift and in a case of call control for connection, connect to the conference server 122 which is a conference server as a shifting destination. In addition, to the session system management unit 226 of the conference server 121, transfer the session system information 320 of the terminal device 131 to enable the conference server 121 to determine a session shifting method according to specification of each terminal device.

Operation of the Present Mode of Implementation

Figure 4:
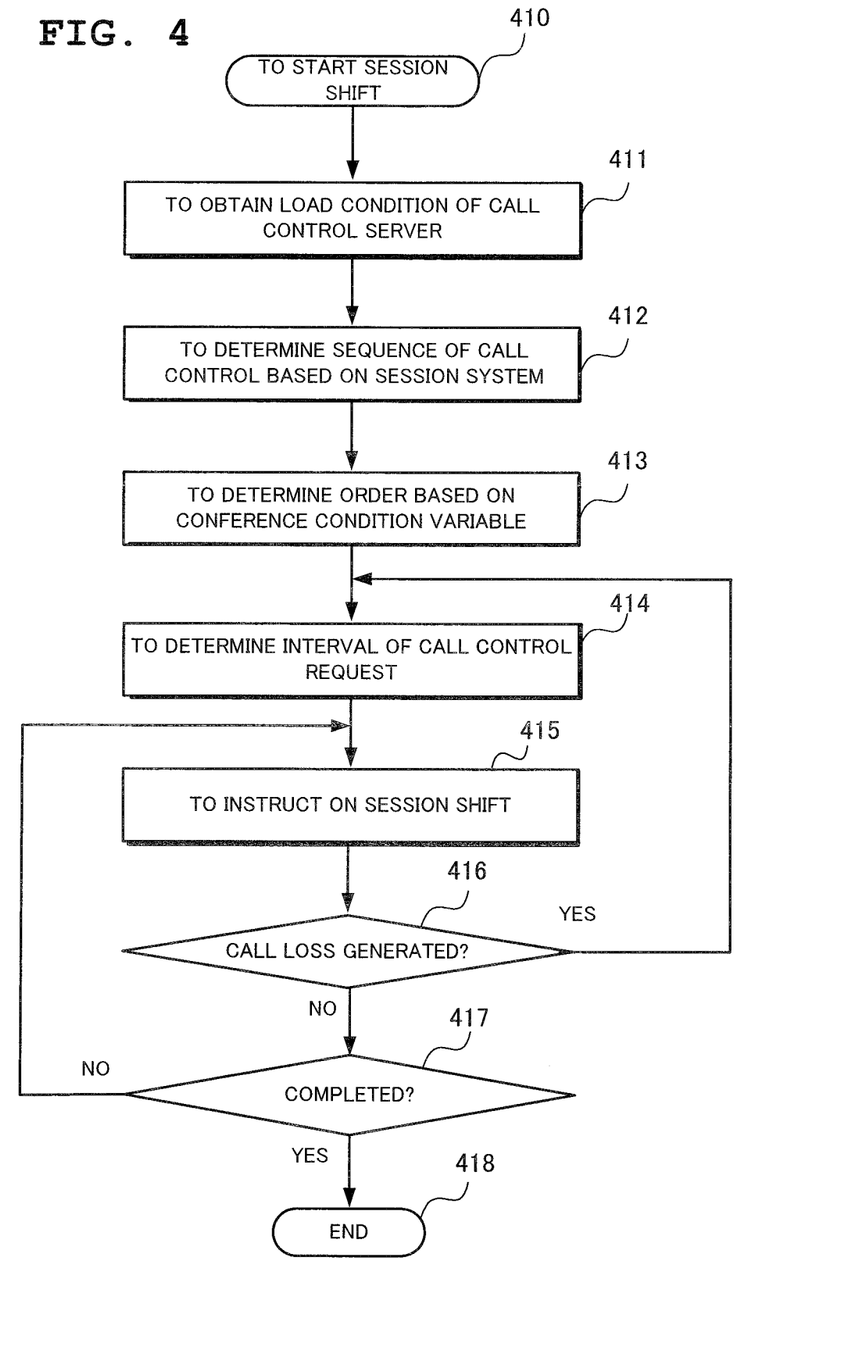
FIG. 4 is a flow chart for use in explaining operation of the conference server according to the present mode of implementation of the present invention.

Next, operation of the present mode of implementation will be detailed with reference to the flow chart shown in FIG. 4.

First, at Step 410, determine to start session shift. The number 312 of participant terminals, the session system list 320 and the conference condition variable 330 to be stored in the storage unit 228 of the conference server 121 are defined before the session shift starts.

Next, at Step 411, the server load monitoring unit 225 of the conference server 121 inquires of the call control server 110 about load conditions to obtain the number 311 of calls controllable per unit time which can be currently controlled.

Next, at Step 412, based on the number 321 of simultaneous sessions and the charging method 322 included in the session system list 320, determine a switching sequence of a session of each terminal device.

The processing of Step 412 is executed as follows, for example.

In a case of a terminal device whose number 321 of simultaneous sessions is "1", determine to first cut off a session to the conference server 121 (execute first) and immediately after that, connect to the conference server 122 (execute immediately after) irrespective of a charging method.

In a case of a terminal device whose number 321 of simultaneous sessions is not less than "2", determine to cut off a session to the conference server 121 after making connection to the conference server 122.

In a case of a terminal device whose number 321 of simultaneous sessions is not less than "2" and whose communication is free, determine to sequentially execute cut-off of a session to the conference server 121 after switching of sessions of all the terminal devices is completed. In a case of charged communication, determine a sequence such that cut-off of a session to the conference server 121 is executed immediately after connection to the conference server 122 is completed.

Next, at Step 413, based on the speaker list 331 of the conference condition variable 330, determine to sequentially shift a session starting at a terminal device whose speech time and operation time are the longest.

In the processing at this Step 413, first group the terminal devices by each base based on the base information 332 to determine a shift order of a terminal device in the group based on the speech time and the operation time of the speaker list 331.

Sequentially merge a shifting order of a group in each base from the top to determine a session shifting order as a whole. This completes the call control list 341.

Next, at Step 414, determine a call control request generation interval (call control timing) based on the number of calls controllable per unit time. This leads to determination of the call control interval 342.

Next, at Step 415, the session shift instructing unit 224 notifies the call control server 110 of a request for call control based on the call control list 341 and the call control interval 342.

Next, at Step 416, determine whether a call loss is generated at the call control server 110. When a call loss is generated, ask for an increase in a numerical value of the call control interval 342 and shift the control to Step 414 to change an interval of a call control request.

Next, at Step 417, determine whether all the call control is completed or not and when it is yet to be completed, shift the control to Step 415. When it is completed, lastly end the shift of a series of sessions at Step 418.

Effects of the Present Mode of Implementation

Next, effects of the present mode of implementation will be described.

In the present mode of implementation, provided is a session switching function of obtaining a call control request generation interval which enables a call loss to be prevented from load information of the call control server 110, specifying an order of session shift by a conference server based on a capacity of switching a session of each terminal device and a conference progress condition to determine a minimum interval that prevents the call control server 110 from having an excessive load, and transmitting a call control request to the call control server 110 at the determined interval such that a session of each terminal device shifts smoothly. In conference server switching in a group conference system, this enables switching of a session of each terminal device to be smoothly completed in as short a time period as possible without imposing loads on the call control server 110.

It is possible that when a session for charged communication is backed up, for example, two charged lines are temporarily set up to have double charging. In the present mode of implementation, a charging method of each terminal device is checked by the charging method 322 of the session system list 320 and in a case of charged communication, an order of call control is determined such that immediately after a call control request is transmitted for the connection to a session shifting destination, a target from which a session is to be shifted is cut off, resulting in enabling a sequence to be determined to prevent double charging as much as possible in charged communication.

Also with respect to a shift order of a terminal device in a group, the present mode of implementation enables session shift without hindering a progress of a conference by determining the session shift order based on an order of speech frequency such as a speech time and an operation time in the speaker list 331 while giving preference to a session of a terminal device whose speech time is long.

Here, description will be made of a hardware structure of the conference servers 121 and 122 according to the above-described mode of implementation with reference to FIG. 11.

Figure 11:
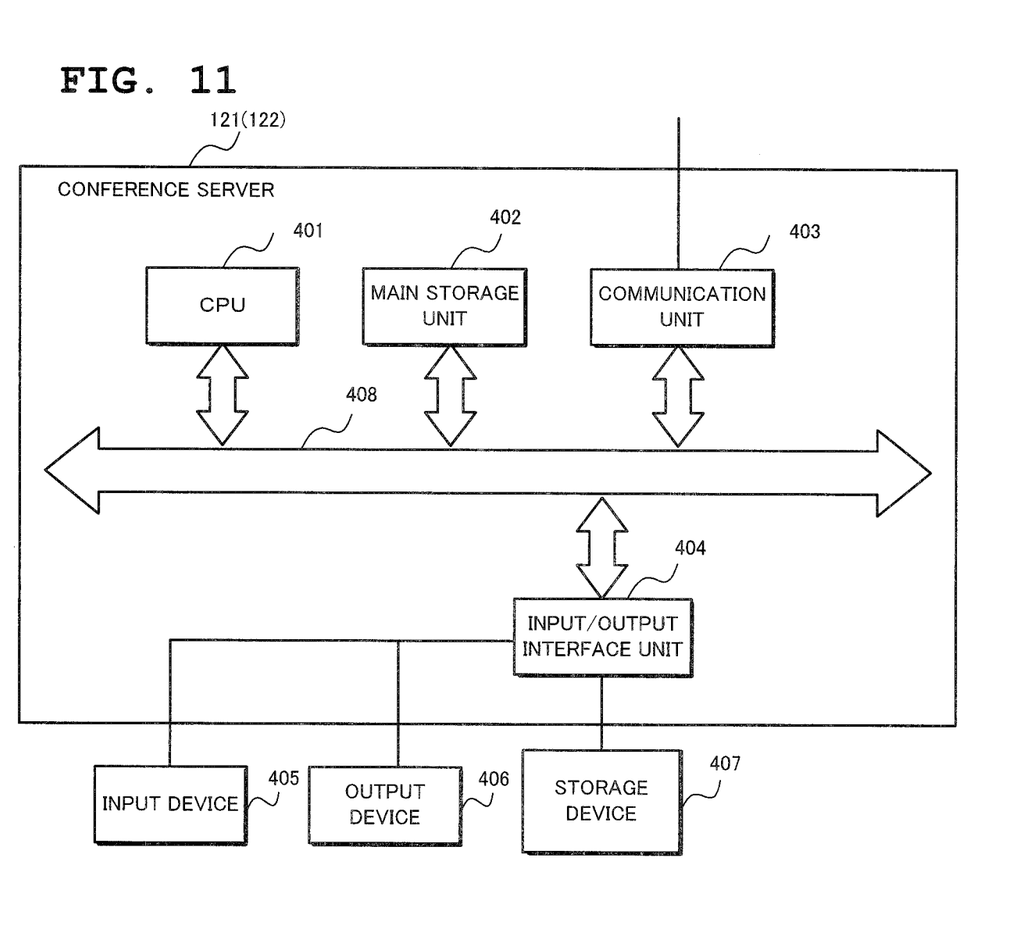
FIG. 11 is a block diagram showing an example of a hardware structure of the conference server according to the present mode of implementation.

With reference to FIG. 11, the conference server 121 (122), which can be realized by the same hardware structure as that of a common computer device, comprises a CPU (Central Processing Unit) 401, a main storage unit 402 which is a main memory such as a RAM (Random Access Memory) for use as a data working region or a data temporary saving region, a communication unit 403 for transmitting and receiving data to/from other device by radio, an input/output interface unit 404 connected to an input device 405 such as a keyboard or a mouse, an output device 406 such as a display device and a storage device 407 to transmit and receive data, and a system bus 408 which connects the above-described respective components with each other. The storage device 407 is realized by a hard disk device or the like formed of a non-volatile memory such as a ROM (Read Only Memory), a magnetic disk and a semiconductor memory.

Hardware structures of the call control server 110 and the terminal devices 131 through 133 are also basically the same as the above-described structure of the conference server.

The conference server 121 (122) according to the present mode of implementation has its operation realized not only in hardware by mounting a circuit part as a hardware part such as an LSI (Large Scale Integration) with a communication control program incorporated which executes such session switching control processing as described above but also in software by storing, in the subsidiary storage unit 407, a program which provides respective functions of the session shift control unit 223, the session shift instructing unit 224, the server load monitoring unit 225, the session system management unit 226, the conference condition finding unit 227 and the like, loading the program into the main storage unit 402 and executing the same by the CPU 401.

Exemplary Embodiment

An exemplary embodiment of the present invention will be described with reference to FIG. 5 through FIG. 10. In the present exemplary embodiment, specifically described will be a change of the call control list 341 as data for determining timing of call control. First, shown in FIG. 5 is an example of the call control list 341 to which the session system list 320 and the conference condition variable 330 for shifting a conference server are input.

Figure 5:
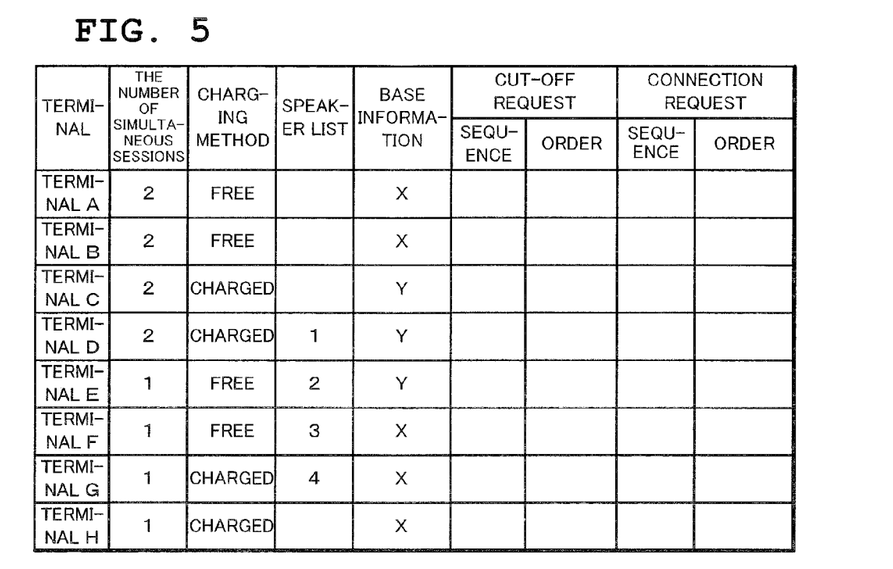
FIG. 5 is a diagram showing an example of data as of before a sequence is determined according to an exemplary embodiment of the present invention.

Listed in the call control list 341 shown in FIG. 5 are eight terminal devices, terminal devices A through H, for which recited are the contents of the number 321 of simultaneous sessions and the charging method 322 of the session system list 320 and the contents of the speaker list (order of frequency of speech) 331 and the base information 332 of the conference condition variable 330.

Figure 6:
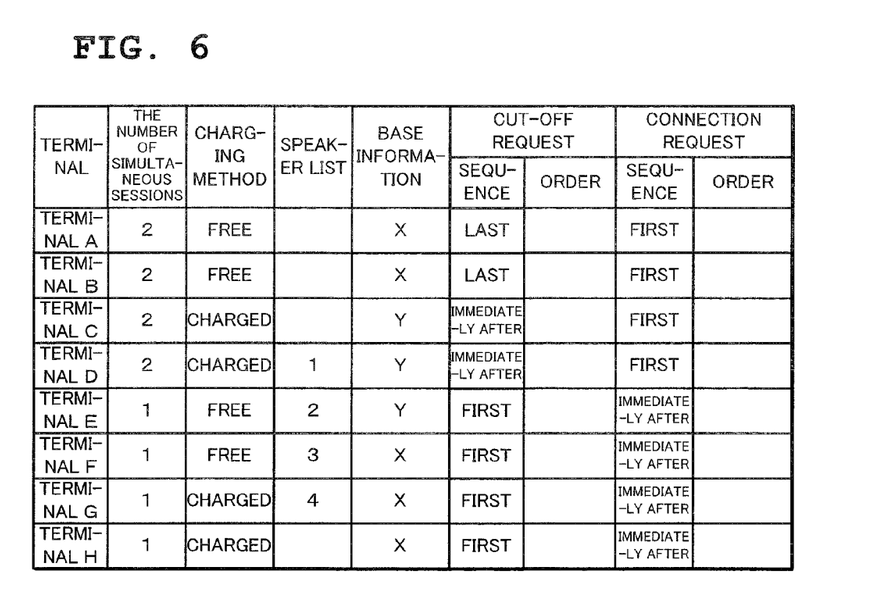
FIG. 6 is a diagram showing an example of data for determining a sequence according to the present exemplary embodiment of the present invention.

Then, in FIG. 6, determine a sequence based on the session system list 320. With respect to each of a cut-off request and a connection request, select "first", "immediately after" and "last" as a sequence.

In this case, when the number of simultaneous sessions is "1" as described above, select "first" as to a cut-off request and "immediately after" as to a connection request irrespective of a charging method.

When the number of simultaneous sessions is "2", select "first" as to a connection request and when a charging method is free, select "last" as to a cut-off request and when a charging method is charged, select "immediately after" as to a cut-off request.

Figure 7:
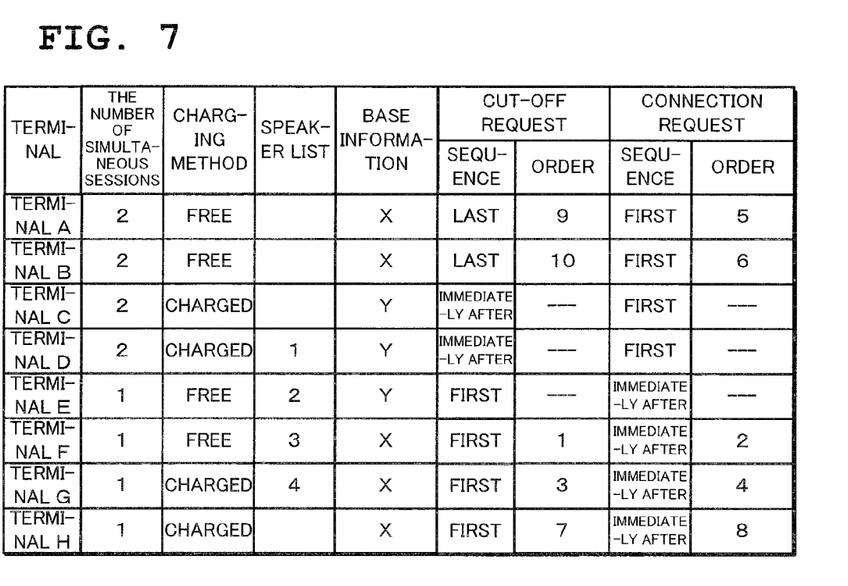
FIG. 7 is a diagram showing an example of data for determining a sequence of a base X according to the present exemplary embodiment of the present invention.
Figure 8:
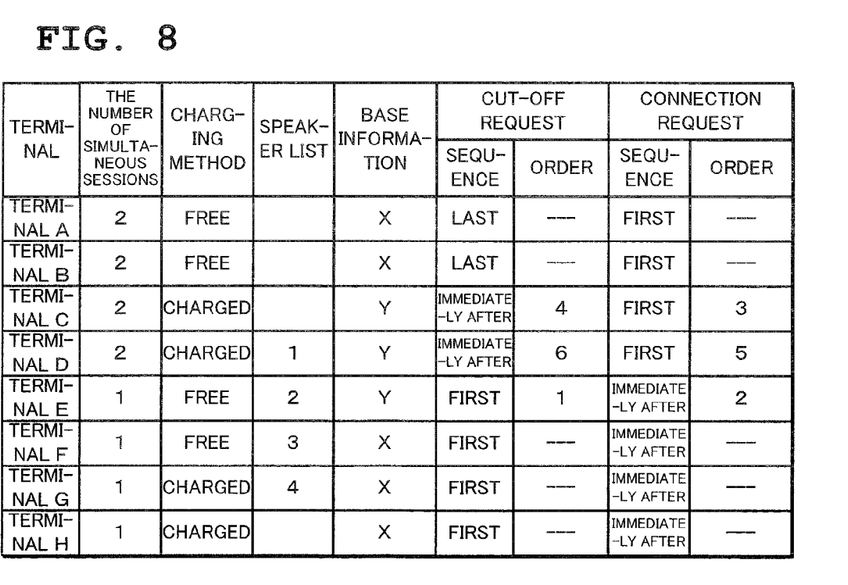
FIG. 8 is a diagram showing an example of data for determining a sequence of a base Y according to the present exemplary embodiment of the present invention.

Next, in FIG. 7 and FIG. 8, determine a shift order of a terminal device at each base. Here, first group the terminal devices A through H by each base based on the base information 332. Then, determine a shift order of a terminal device in a group based on a speech frequency order such as a speech time and an operation time in the speech list 331.

In FIG. 7, a shift order of a terminal device included in a group of a base X is determined, in which sequentially selected are items whose sequence has "first" and when a request to be paired has "immediately after", a serial number of the item with "first" is input to an item with "immediately after".

Then, to items whose sequence has "last", sequentially input orders from the top after all the other items are filled in.

At this time, when the speaker list has an order, determine an order while giving preference to the order of the speaker list. More specifically, among items having "first" as a sequence, as to items in which the speaker list (speech frequency order) 331 is input, select a terminal device in a descending order of the speaker list (speech frequency order) 331 to determine an order.

As to a terminal device whose speaker list has no order, sequentially select a terminal device from the top in the table of FIG. 7 to allot an order after ordering of all the items other than an item whose sequence is "last" is completed as to a terminal device whose speaker list has an order. As to the terminal devices A, B and H in FIG. 7, for example, because they have no order of the speaker list, "5" and "6" are allotted from the top as an order to items of the terminal devices A and B whose sequence has "first", the order "7" is allotted to an item of the terminal device H whose sequence is "first" and the order "8" is allotted to an item whose sequence is "immediately after".

In FIG. 8, a shift order of a terminal device included in a group of a base Y is determined, in which a method of determining the order is the same as the method of determining an order of a terminal device of the base X.

Figure 9:
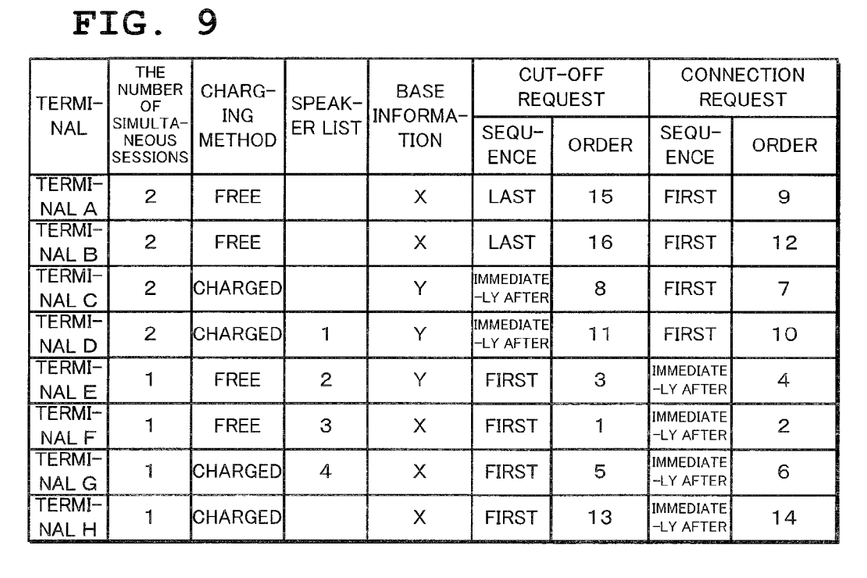
FIG. 9 is a diagram showing an example of data for determining an ultimate order according to the present exemplary embodiment of the present invention.

Then, in FIG. 9, merge an order of a terminal device in a group of the base X and an order of a terminal device in a group of the base Y to determine an ultimate order. As to merging of orders in this case, the orders are merged so as to execute a call control request alternately with respect to the terminal devices of the base X and the base Y. In FIG. 9, for example, starting with the terminal device F whose order is the highest among the terminal devices of the base X, a sequence is sequentially determined such as the terminal device E of the base Y, the terminal device G of the base X, the terminal device C of the base Y . . . . It is as a matter of course possible to execute merging such that the order starts with a terminal device of the base Y.

At this stage, the order of 16 call control requests is determined as a request for call control of cut-off and connection of the eight terminal devices in the call control list 341, the terminal device A to the terminal device H.

Figure 10:
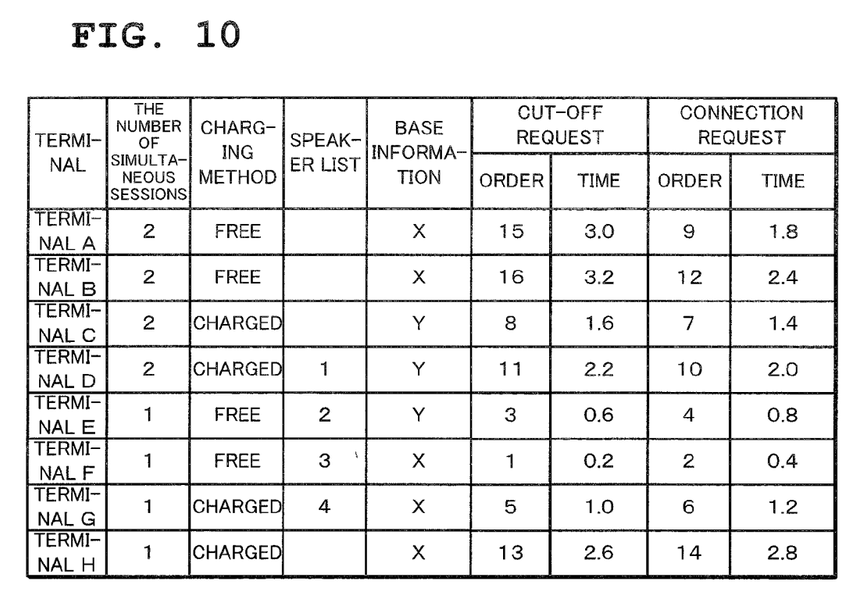
FIG. 10 is a diagram showing an example of data for determining timing of call control according to the present exemplary embodiment of the present invention.

Lastly, as shown in FIG. 10, when 0.2 sec. is designated as the call control interval 342 which is determined according to a load condition of the call control server 110, execute a request for call control with respect to each of a cut-off request and a connection request at every 0.2 sec. according to the order of a call control request.

Shown in FIG. 10 is timing of call control to be executed with respect to each order of a call control request for a cut-off request and a connection request. In this example, since call control for the switching of sessions of the eight terminal devices is executed within three seconds in total, switching of a session of each terminal device can be realized smoothly in a short time period without imposing loads on the call control server 110.

Although the present invention has been described with respect to the preferred mode of implementation and exemplary embodiment in the foregoing, the present invention is not necessarily limited to the above-described mode of implementation and exemplary embodiment and can be implemented in various modifications without departing from the scope of its technical idea.

INCORPORATION BY REFERENCE

This application is based upon and claims the benefit of priority from Japanese patent application No. 2008-178979, filed on Jul. 9, 2008, the disclosure of which is incorporated herein in its entirety by reference.

INDUSTRIAL APPLICABILITY

In a system realizing a conference having numbers of participants such as a Web conference system and a television conference system, the present invention realizes smooth shift of a conference server in the shortest time period without causing a call control server to have an excessive load.

What is claimed is:

1. A conference server connected to a call control server which relays a request for call control of a group conference system and a plurality of terminal devices, comprising:
a session shift control unit which determines an order of a request for call control of each terminal device which request is related to cut-off from a target from which a session is to be shifted and connection to a session shifting destination according to information related to session generation of each said terminal device and a conference condition and determines timing of call control based on a load condition of said call control server; and
a session shift instructing unit which transmits a request for call control to said call control server according to said determined order and timing, wherein said session shift control unit determines an order of a call control request so as to,
when each terminal device is allowed to simultaneously set up a plurality of sessions, transmit a call control request for the cut-off from a target from which a session is to be shifted after transmitting a call control request for the connection to a session shifting destination, and
when each terminal device is not allowed to simultaneously set up a plurality of sessions, transmit a call control request for the connection to the session shifting destination after transmitting a call control request for the cut-off from the target from which a session is to be shifted and
wherein with respect to said terminal device which is allowed to simultaneously set up a plurality of sessions, said session shift control unit determines a charging system of each terminal device and in a case of free communication, determines an order of a call control request so as to transmit a call control request for the connection to a session shifting destination and thereafter when call control related to other terminal device is completed, transmit a call control request for the cut-off from a target from which a session is to be shifted and in a case of charged communication, determines an order of call control so as to transmit a call control request for the cut-off from the target from which a session is to be shifted immediately after transmitting a call control request for the connection to the session shifting destination.

2. The conference server according to claim 1, further comprising:
a server load monitoring unit which finds a load condition of said call control server,
a session system management unit which manages information related to session generation of each said terminal device, and
a conference condition finding unit which finds a conference condition including base information of said terminal device and a speech condition.

3. The conference server according to claim 1, wherein said session shift control unit calculates a load of said call control server as the number of calls controllable per unit time and determines shift timing of a session in the group conference system of each terminal device according to the number of calls controllable per unit time which is designated by said call control server.

4. The conference server according to claim 3, wherein said session shift control unit determines a time interval of a request for call control to be transmitted to said call control server as session shift timing in the group conference system of each terminal device.

5. The conference server according to claim 1, wherein said session shift control unit determines a base of each said terminal device and determines an order of call control so as to distributedly execute processing of call control on a base basis.

6. The conference server according to claim 5, wherein said session shift control unit determines an order of call control so as to alternately transmit a request for call control of each terminal device on a base basis.

7. The conference server according to claim 1, wherein said session shift control unit determines an order of call control so as to execute session shift starting with a terminal device which speaks a lot based on a speech condition of each said terminal device speaking in the group conference system.

8. The terminal device according to claim 1, comprising a function as a conference server.

9. A group conference system including a call control server which relays a request for call control, a plurality of terminal devices and a conference server for controlling session switching of said terminal device, wherein said conference server comprises:

a session shift control unit which determines an order of a request for call control of each terminal device which request is related to cut-off from a target from which a session is to be shifted and connection to a session shifting destination according to information related to said session generation of each said terminal device and said conference condition and determines timing of call control based on a load condition of said call control server; and a session shift instructing unit which transmits a request for call control to said call control server according to said determined order and timing, wherein said session shift control unit determines an order of a call control request so as to, when each terminal device is allowed to simultaneously set up a plurality of sessions, transmit a call control request for the cut-off from a target from which a session is to be shifted after transmitting a call control request for the connection to a session shifting destination, and when each terminal device is not allowed to simultaneously set up a plurality of sessions, transmit a call control request for the connection to the session shifting destination after transmitting a call control request for the cut-off from the target from which a session is to be shifted and wherein with respect to said terminal device which is allowed to simultaneously set up a plurality of sessions, said session shift control unit determines a charging system of each terminal device and in a case of free communication, determines an order of a call control request so as to transmit a call control request for the connection to a session shifting destination and thereafter when call control related to other terminal device is completed, transmit a call control request for the cut-off from a target from which a session is to be shifted and in a case of charged communication, determines an order of call control so as to transmit a call control request for the cut-off from the target from which a session is to be shifted immediately after transmitting a call control request for the connection to the session shifting destination.

10. The group conference system according to claim 9, wherein said conference server further comprises a server load monitoring unit which finds a load condition of said call control server, a session system management unit which manages information related to session generation of each said terminal device, and a conference condition finding unit which finds a conference condition including base information of said terminal device and a speech condition.

11. The group conference system according to claim 9, wherein said session shift control unit calculates a load of said call control server as the number of calls controllable per unit time and determines shift timing of a session in the group conference system of each terminal device according to the number of calls controllable per unit time which is designated by said call control server.

12. The group conference system according to claim 11, wherein said session shift control unit determines a time interval of a request for call control to be transmitted to said call control server as session shift timing in the group conference system of each terminal device.

13. The group conference system according to claim 9, wherein said session shift control unit determines a base of each said terminal device and determines an order of call control so as to distributedly execute processing of call control on a base basis.

14. The group conference system according to claim 13, wherein said session shift control unit determines an order of call control so as to alternately transmit a request for call control of each terminal device on a base basis.

15. The group conference system according to claim 9, wherein said session shift control unit determines an order of call control so as to execute session shift starting with a terminal device which speaks a lot based on a speech condition of each said terminal device speaking in the group conference system.

16. A session switching control method, wherein a conference server connected to a call control server which relays a request for call control of a group conference system and a plurality of terminal devices executes:

a session shift control step of determining an order of a request for call control of each terminal device which request is related to cut-off from a target from which a session is to be shifted and connection to a session shifting destination according to information related to session generation of each said terminal device and a conference condition and determining timing of call control based on a load condition of said call control server; and a session shift instructing step of transmitting a request for call control to said call control server according to said determined order and timing, wherein at said session shift control step, an order of a call control request is determined so as to, when each terminal device is allowed to simultaneously set up a plurality of sessions, transmit a call control request for the cut-off from a target from which a session is to be shifted after transmitting a call control request for the connection to a session shifting destination, and when each terminal device is not allowed to simultaneously set up a plurality of sessions, transmit a call control request for the connection to the session shifting destination after transmitting a call control request for the cut-off from the target from which a session is to be shifted and wherein at said session shift control step, with respect to said terminal device which is allowed to simultaneously set up a plurality of sessions, a charging system of each terminal device is determined and in a case of free communication, an order of a call control request is determined so as to transmit a call control request for the connection to a session shifting destination and thereafter when call control related to other terminal device is completed, transmit a call control request for the cut-off from a target from which a session is to be shifted and in a case of charged communication, an order of call control is determined so as to transmit a call control request for the cut-off from the target from which a session is to be shifted immediately after transmitting a call control request for the connection to the session shifting destination.

17. The session switching control method according to claim 16, further comprising:
- a server load monitoring step of finding a load condition of said call control server,
- a session system management step of managing information related to session generation of each said terminal device, and
- a conference condition finding step of finding a conference condition including base information of said terminal device and a speech condition.

18. The session switching control method according to claim 16, wherein at said session shift control step, a load of said call control server is calculated as the number of calls controllable per unit time to determine shift timing of a session in the group conference system of each terminal device according to the number of calls controllable per unit time which is designated by said call control server.

19. The session switching control method according to claim 18, wherein at said session shift control step, a time interval of a request for call control to be transmitted to said call control server is determined as session shift timing in the group conference system of each terminal device.

20. The session switching control method according to claim 16, wherein at said session shift control step, a base of each said terminal device is determined and an order of call control is determined so as to distributedly execute processing of call control on a base basis.

21. The session switching control method according to claim 20, wherein at said session shift control step, an order of call control is determined so as to alternately transmit a request for call control of each terminal device on a base basis.

22. The session switching control method according to claim 16, wherein at said session shift control step, an order of call control is determined so as to execute session shift starting with a terminal device which speaks a lot based on a speech condition of each said terminal device speaking in the group conference system.

23. A computer readable storage device storing a program which causes a computer connected to a call control server that relays a request for call control of a group conference system and a plurality of terminal devices to execute:
- a session shift control processing of determining an order of a request for call control of each terminal device which request is related to cut-off from a target from which a session is to be shifted and connection to a session shifting destination according to information related to session generation of each said terminal device and a conference condition and determining timing of call control based on a load condition of said call control server; and
- a session shift instructing processing of transmitting a request for call control to said call control server according to said determined order and timing, wherein in said session shift control processing, an order of a call control request is determined so as to, when each terminal device is allowed to simultaneously set up a plurality of sessions, transmit a call control request for the cut-off from a target from which a session is to be shifted after transmitting a call control request for the connection to a session shifting destination, and when each terminal device is not allowed to simultaneously set up a plurality of sessions, transmit a call control request for the connection to the session shifting destination after transmitting a call control request for the cut-off from the target from which a session is to be shifted and wherein in said session shift control processing, with respect to said terminal device which is allowed to simultaneously set up a plurality of sessions, a charging system of each terminal device is determined, and in a case of free communication, an order of a call control request is determined so as to transmit a call control request for the connection to a session shifting destination and thereafter when call control related to other terminal device is completed, transmit a call control request for the cut-off from a target from which a session is to be shifted and in a case of charged communication, an order of call control is determined so as to transmit a call control request for the cut-off from the target from which a session is to be shifted immediately after transmitting a call control request for the connection to the session shifting destination.

24. The computer readable storage device according to claim 23, further storing a program which causes said computer to execute:
- a server load monitoring processing of finding a load condition of said call control server,
- a session system management processing of managing information related to session generation of each said terminal device, and
- a conference condition finding processing of finding a conference condition including base information of said terminal device and a speech condition.

25. The computer readable storage device according to claim 23, wherein in said session shift control processing, a load of said call control server is calculated as the number of calls controllable per unit time to determine shift timing of a session in the group conference system of each terminal device according to the number of calls controllable per unit time which is designated by said call control server.

26. The computer readable storage device according to claim 25, wherein in said session shift control processing, a time interval of a request for call control to be transmitted to said call control server is determined as session shift timing in the group conference system of each terminal device.

27. The computer readable storage device according to claim 23, wherein in said session shift control processing, a base of each said terminal device is determined and an order of call control is determined so as to distributedly execute processing of call control on a base basis.

28. The computer readable storage device according to claim 27, wherein in said session shift control processing, an order of call control is determined so as to alternately transmit a request for call control of each terminal device on a base basis.

29. The computer readable storage device according to claim 23, wherein in said session shift control processing, an order of call control is determined so as to execute session shift starting with a terminal device which speaks a lot based on a speech condition of each said terminal device speaking in the group conference system.

* * * * *